A. A. SMITH AND H. W. PAINE.
TIRE CHAIN LOCK AND ELASTIC TAKE-UP.
APPLICATION FILED MAY 26, 1920.

1,374,771.

Patented Apr. 12, 1921.

WITNESSES
E. E. Duffy
F. T. Chapman

INVENTORS
A. A. Smith & H. W. Paine
BY C. G. Siggers
ATTORNEY

UNITED STATES PATENT OFFICE.

ARTHUR A. SMITH AND HARRY W. PAINE, OF EAGLE GROVE, IOWA.

TIRE-CHAIN LOCK AND ELASTIC TAKE-UP.

1,374,771.   Specification of Letters Patent.   Patented Apr. 12, 1921.

Continuation of application Serial No. 361,949, filed February 28, 1920. This application filed May 26, 1920. Serial No. 384,456.

*To all whom it may concern:*

Be it known that we, ARTHUR A. SMITH and HARRY W. PAINE, citizens of the United States, residing at Eagle Grove, in the county of Wright and State of Iowa, have invented a new and useful Tire-Chain Lock and Elastic Take-Up, of which the following is a specification.

This invention has reference to automobile tire chain locks and elastic take-ups therefor, and its object is to provide a readily applicable and separable lock for the side members of automobile anti-skid chains with the locks so constructed that the chains may be applied tightly to the tires without detriment.

Ordinarily, the side members of anti-skid tire chains are inelastic longitudinally and consequently the side members of the tire chains are applied loosely so as not to bind on the tire and injure it. In order to hold the tire chain on the tire, locks or latches are needed, but because of the looseness of application of the chain to the tire it quite frequently happens that, from one cause or another, the latches become opened and the chains lost. This means not only a money loss, representing several dollars for each chain, but it may present an element of danger, for the loss may occur when traffic conditions are particularly bad and when travel must continue without the aid of the anti-skid chains.

In accordance with the invention, the ends of the side chains are held together by elastically yieldable lock or latches, not only readily attached or detached, but placing a tension upon the side chains. This tends to hold them in the attached position whatever be the conditions encountered, so that the lock or latch, if moved to a position where it might otherwise fall apart with a resultant loss of the chain, always returns to the securely locked position in case of temporary displacement of an accidental nature.

The invention comprises two similar members slidable one on the other and surrounded by a spring acting at the ends upon the two members in a manner to cause each member or slide to move into a relation to the other member or slide to securely hold the corresponding end of the chain against release. The construction is, however, of such character as to permit movement of the latch or lock to a position permitting the ready application to or detachment of one end of the tire chain from the lock without liability of the chain becoming automatically detached or unfastened from the lock. Furthermore, the lock is of a nature to put longitudinal elastic tension upon the chain to hold the latter taut while upon the automobile tire.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

Figure 1:
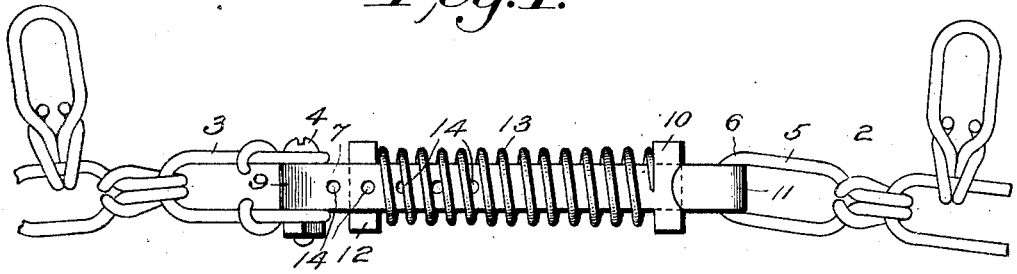
Figure 1 is a side elevation of a tire chain lock embodying the invention.

Referring to the drawings, there are shown two end portions 1 and 2, respectively, of a side member of an anti-skid tire chain which may be considered as of ordinary construction and therefore needing no particular description. One end of the side member 1 terminates in a link 3 having the free ends connected by a bolt 4 or other suitable connecting device. The end link 5 of the member 2 terminates in a closed loop 6.

The chain lock or latch comprises two slides 7, 8 movable lengthwise upon each other in contact or substantial contact. One end of the slide 7 terminates in a loop 9, and the other end terminates in a cross head 10 at substantially right angles to the slide. One end of the slide 8 terminates in a spread loop 11 which may be sufficiently open to permit the entrance of the closed end 6 of the chain link 5, while the other end of the same slide 8 terminates in a cross head 12 similar to the head 10. Surrounding the two slides, which are in face to face contact, between the cross heads 10 and 12, is a spring 13 which may be a helical spring of the expansion type and of appropriate length. The tendency of the spring 13 is to move the cross heads 10 and 12 away from each other until the more open loop 11 is brought into overhanging relation to the cross head 10 and the loop 9 closely approaches the cross head 12, although it need not necessarily be in actual engagement therewith, since the loop 9 may be sufficiently small to prevent escape of the bolt or other holding device 4. The slide 7 has a longitudinal series of holes or perforations 14 formed therein.

When the lock is applied to the anti-skid chain, the loop 9 is traversed by the bolt 4 which also traverses the terminal loops of the legs of the link 3. Whether or not a bolt or rivet or the like be employed as the fastening means, it is made secure by riveting or in some other appropriate manner, wherefore it may be considered as a permanent part of the chain and pivoted to that end of the chain to which it is attached. The loop 9 is substantially closed and therefore the fastening 4 cannot escape therefrom.

When it is desired to attach the other end of the tire chain to the lock, the end link 5 is engaged between the head 10 and the mouth of the loop or hook 11, which open end of the loop or hook 11 is somewhat angularly related to the cross head 10, whereby the link 5 on being drawn in the direction of the length of the lock, forces its way into the throat of the loop or hook 11, and compressing the spring 13, enters the loop or hook 11. In this manner, the mouth of the loop 11 is enlarged sufficiently to permit the link 5 to snap thereinto, whereupon the reaction of the spring 13 will cause the loop 11 to move toward the head 10 to close the throat of the loop against escape of the link 5, the parts being so proportioned that the lock is substantially closed where entered by the link 5, when the pull on the loop 11 is relieved.

Figure 3:
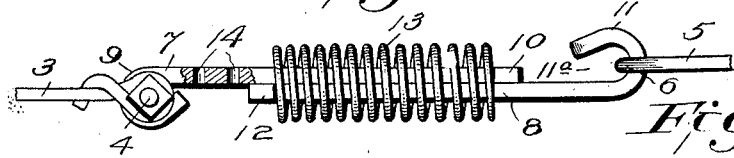
Fig. 3 is a longitudinal view of the lock or latch structure removed from the chain, showing the lock extended in opposition to its normal tendency.
Figure 4:
Fig. 4 is a detail perspective of one end of one of the side bars of the lock.

The link 5, representing the free end of the chain, is applied to the lock by the simple expedient of snapping it thereinto, whereupon the two ends of the chain are held together against any accidentally applied force tending to pull the loop 11 away from the head 10. Should such opening of the lock occur, the link 5 cannot accidentally escape, because the opening force is then exerted in a direction holding the link 5 in the loop 11. When it is desired to disconnect the link 5 from the lock, a suitable force is applied lengthwise of the link 5 and lock, and the slide 8 is held in the extended position, such as shown in Fig. 3, by engaging the fingers of the hand between the loop 9 and the cross head 12 or a pin may be inserted in a suitable one of the perforations 14, holding the slides in the position shown in Fig. 3. Then, on relieving the link 5 from the pull exerted on it to compress the spring 13, the link 5 may be readily removed from the loop 11.

When the two slides 7 and 8 have been pulled apart and a nail or pin has been passed through one of the holes or perforations 14 and is engaged by the end of the slide 8, the lock is held extended by the engagement of the end of the slide 8 with the nail and the spring is then under considerable tension. Under such circumstances, a suitable one of the links 5 may be applied to the loop 11, thus taking up any excessive slack that may occur in the chain, but only to an extent which will permit the throat of the loop 11 to be substantially closed, after which the nail or the like is removed, so that the tension of the spring will maintain the chain in the desired position.

Even if the chain be left loose, it cannot unhook, since the spring holds the lock closed. When the chain is tight, it cannot become accidentally unhooked since the tension of the spring holds the link 5 tight in the bottom of the hook 11. The chain lock serves to maintain the chain on the tire, whether the chain be adjusted tightly or loosely, and in either event the chain lock serves a further function, as a shock absorber or spring cushion for the side members of the tire chain, keeping them tight and thus decreasing wear, as well as absorbing sudden shocks in starting and stopping the automobile. Such shocks often amount to hundreds of pounds, and stretch and bend the links in the side chains and greatly decrease the life of a set of chains.

Figure 2:
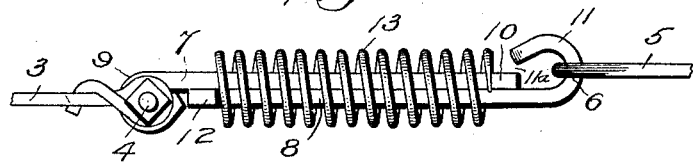
Fig. 2 is an edge view of the structure shown in Fig. 1.
Figure 5:
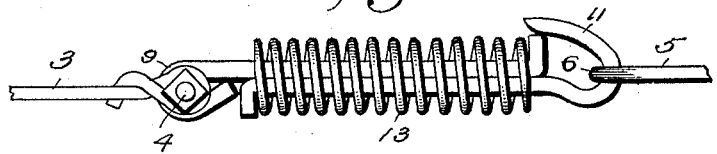
Fig. 5 is a view similar to Fig. 2 but showing a modification thereof.

In Figs. 2 and 3, the open mouth of the loop 11 is indicated at 11ª, while in Fig. 5 the mouth of the loop 11 instead of approaching the base of the loop, spreads away therefrom to receive the head of the slide 7, thereby facilitating the introduction of the link 5 into the loop 11. In either form the link 5 readily snaps into the loop 11 without necessitating any special means for admitting the link 5 into the loop 11.

This application is a continuation of our application Serial Number 361,949 filed February 28, 1920, for tire chain lock, so far as the two applications contain common subject matter.

What is claimed is:

1. A tire chain lock and elastic take-up, comprising oppositely movable bars or slides in face to face engagement, each bar terminating at one end in a loop and at the other end in a lug angularly related to the bar, and a spring surrounding the two bars and holding them in contact and at the ends engaging the respective lugs, the loop of one of the bars being sufficiently open to form a throat to receive a link of the side chain of the tire chain and also the lug of the other bar, said lug entering and substantially closing the open throat of the loop, and the portion of the lug entering the throat end being coactively shaped with reference to the throat whereby to cause the entrance of a link into the throat to automatically force the lug out of the throat in opposition to the tendency of the spring to move the lug into closing relation to the throat.

2. A tire chain lock and elastic take-up comprising two oppositely movable bars or slides in face to face engagement, each slide having a loop at one end and at the other end provided with a cross-head outstanding from the respective bar, and a spring surrounding the bars or slides between the cross-heads, one of the loops having an open throat and the adjacent cross-head of the other bar entering and forming a substantial closure for said throat, in combination with a tire chain having one end permanently connected to the loop remote from the open-throated loop and the other end of the chain being adapted to enter and be held in the open-throated loop by the abutment of the throat end of the loop against the adjacent cross-head, whereby on holding the permanently fast end of the chain and drawing a link of the other end of the chain into the open throat and against the lug constituting a substantial closure therefor, the lug is caused to automatically yield and admit the link and then reclose the loop.

3. A tire chain lock and elastic take-up comprising oppositely movable bars or slides in face to face engagement, one of the bars terminating at one end in a lug in the form of a cross-head and the other bar terminating at the same end in an open loop spread at the mouth to receive the cross-heads of the first named bar and form a closure for said mouth, and a spring surrounding and holding the bars together, with that bar other than the one provided with the mouth entered by the cross-head having a longitudinal series of holes or perforations to receive a nail or pin to be engaged by the corresponding end of the other bar, to thereby temporarily hold the cross-head away from the mouth of the loop normally entered by said cross head.

In testimony, that we claim the foregoing as our own, we have hereto affixed our signatures.

ARTHUR A. SMITH.
HARRY W. PAINE.